W. B. ROYER.
SAFETY VALVE FOR FLUID PRESSURE PIPES.
APPLICATION FILED AUG. 11, 1919.
1,418,096.
Patented May 30, 1922.
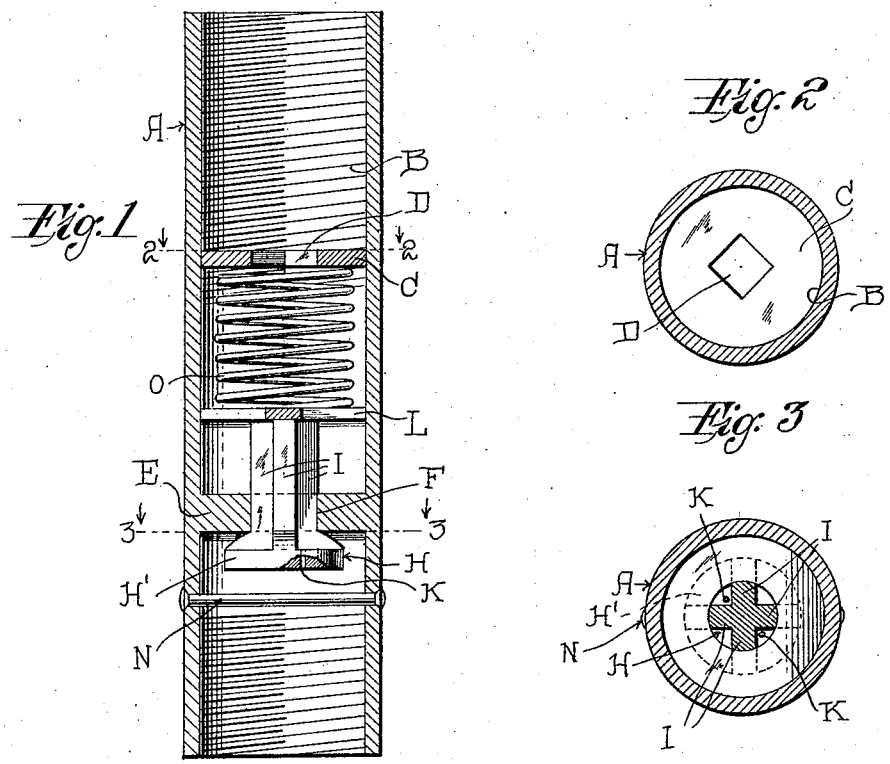
Inventor:
Wm. B. Royer
By A. L. Hough
Attorney.

UNITED STATES PATENT OFFICE.

WILLIAM B. ROYER, OF BALTIMORE, MARYLAND, ASSIGNOR OF ONE-HALF TO DAVID E. SHRIVER, OF BALTIMORE, MARYLAND.

SAFETY VALVE FOR FLUID-PRESSURE PIPES.

1,418,096.   Specification of Letters Patent.   Patented May 30, 1922.

Application filed August 11, 1919. Serial No. 316,671.

*To all whom it may concern:*

Be it known that I, WILLIAM B. ROYER, a citizen of the United States, residing at Baltimore, in the county of Baltimore and State of Maryland, have invented certain new and useful Improvements in Safety Valves for Fluid-Pressure Pipes, of which the following is a specification, reference being had therein to the accompanying drawing.

This invention relates to new and useful improvements in safety valves for fluid pressure pipes for use in connection with pneumatic hammers, and consists of a simple device of this nature adapted to automatically cut off the pressure of air in the event of a breakage of the pipe intermediate the valve and its connection to the hammer, and providing means for equalizing the pressure within the pipe.

My invention comprises various details of construction, combination and arrangement of parts which will be hereinafter fully described, shown in the accompanying drawings and then specifically defined in the appended claim.

My invention is illustrated in the accompanying drawings which, with the letters of reference marked thereon, form a part of this application, and in which:

Figure 1 is a vertical central sectional view through a fluid pressure pipe and safety valve mechanism.

Figure 2 is a sectional view on line 2—2 of Figure 1, and

Figure 3 is a sectional view on line 3—3 of Figure 1.

Reference now being had to the details of the drawings by letter:

A designates a fluid pressure pipe adapted to be connected at one end to a pneumatic hammer. Said pipe is interiorly threaded as at B to receive an adjusting nut C circumferentially threaded, and which has a square outlined opening D centrally formed therein, designed to receive a tool of similar shape for the purpose of turning the nut. Within said pipe is a partition E having a valve opening F therein, and H is a valve having a shank portion with radially extending wings I guided in said valve opening as the latter moves back and forth.

One end H' of the valve is flaring, and K are small apertures formed in the valve and through which air may pass for the purpose of equalizing pressure upon opposite sides of the valve.

A pin N is passed through diagonally opposite apertures in the walls of the pipe a slight distance from the head H' of the valve, said pin tending to limit the movement of the valve in one direction. A washer L is positioned within the pipe and O is a coiled spring, one end of which bears against the nut C and the other end against the washer L, the purpose of said spring and washer being to hold the valve unseated and against the pin N. The tension of the spring is regulated by moving the nut C within the pipe, the spring being regulated to the pressure of air which will bear against the valve.

In operation, the device is inserted in the air line at any point, as for instance, adjacent to the pneumatic tool. The tension of the spring O tends to hold the valve H unseated. The initial pressure of the air against the valve H seats this valve. The bleeders K permit the air to pass through in sufficient quantities to quickly balance the air in the rear of the valve, whereupon the spring O opens the valve. There is always sufficient back pressure of air at the implement to act in conjunction with the tension of the spring to hold the valve open until the tension is suddenly released by the breakage of the air line in some manner, whereupon the pressure will at once close the valve. It is obvious, of course, that a very minor volume of air will continue to bleed through the bleeders K, but it is inconsequential. When the implement has been repaired and the line closed, the bleeding through the bleeders K will again act in conjunction with the spring O to open the valve, whereupon operations may be resumed.

What I claim to be new is:

A safety device for fluid pressure conduits comprising a cylindrical casing having a constricted integral valve seat therein, a valve proportioned to seat in said valve seat and having a stem inserted therethrough axially of the casing, a spider carried rigidly by the stem upon the side of the seat opposite the valve and slidable with the extremities of its legs in contact with the interior of the casing, a spring bearing directly upon the spider, and a disk having a central passage bearing upon the spring opposite the spider and adjustable longitudinally of the casing.

In testimony whereof I hereunto affix my signature in presence of a witness.

WILLIAM B. ROYER.

Witness:
  A. L. HOUGH.